Figures 1, 2:
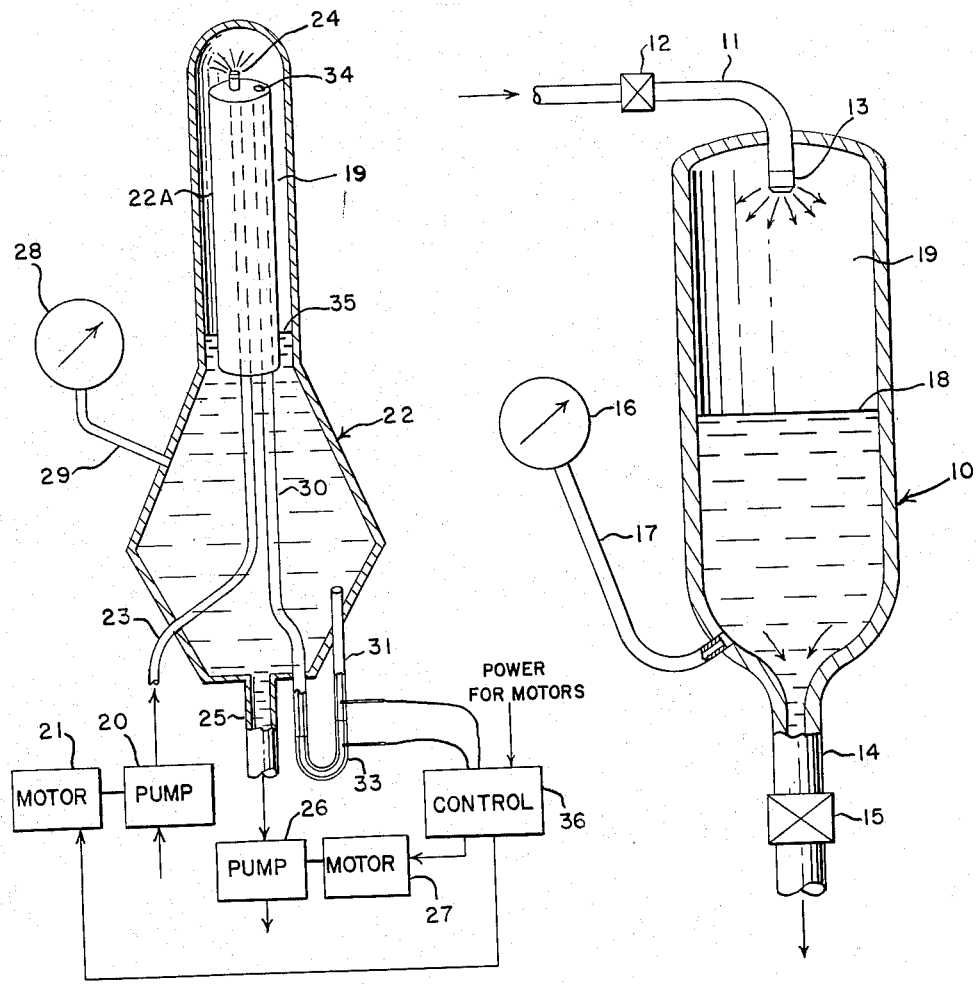

April 17, 1956  H. M. FITZPATRICK ET AL  2,741,911
GAS CONCENTRATION MEASUREMENT
Filed Aug. 29, 1952  2 Sheets-Sheet 1

INVENTORS
HUGH M. FITZPATRICK
MARGARET F. HARKLEROAD
BY George Sipkin
B. L. Zangwill
ATTORNEYS April 17, 1956    H. M. FITZPATRICK ET AL    2,741,911
GAS CONCENTRATION MEASUREMENT
Filed Aug. 29, 1952    2 Sheets-Sheet 2

INVENTORS
HUGH M. FITZPATRICK
MARGARET F. HARKLEROAD

BY
ATTORNEYS

United States Patent Office 2,741,911
Patented Apr. 17, 1956

2,741,911

GAS CONCENTRATION MEASUREMENT

Hugh M. Fitzpatrick, Washington, D. C., and Margaret F. Hackleroad, Bethesda, Md.

Application August 29, 1952, Serial No. 307,182

3 Claims. (Cl. 73—19)

(Granted under Title 35, U. S. Code (1952), sec. 266)

The invention described herein may be manufactured and used by or for the Government of the United States of America for governmental purposes without the payment of any royalties thereon or therefor.

This invention relates to the measurement of the concentration of a gas in a liquid and more particularly to method and apparatus for providing continuous measurement of the concentration of a gas in a liquid.

Devices of the aforementioned type find application in widely varying fields such, for example, in testing feed water supply to boilers or in various operations and testing processes involving hydraulic devices where it is desired to determine and maintain constant the concentration of air in water. A further specific example where it is desired to determine and maintain constant the concentration of air in water is in cavitation studies involving solid structures which possess motion relative to a water mass.

Previously available devices for the measurement of the concentration of a gas in the liquid, particularly air in water, are subject to numerous limitations which prevent their widespread satisfactory use in continuous indication. Some of these prior art devices require, for example, the introduction of a scavenger gas such as hydrogen or do not provide a continuous indication or provides material alteration in the composition of the sample selected preventing its return to the mass of the liquid, all of which limitations are undesirable.

In accordance with the above, it is an object of the present invention to provide a simple instrument for measuring the concentration of a gas in a liquid.

It is a further object of the present invention to provide a method of measuring the concentration of a gas in a liquid.

It is another object of the present invention to provide an instrument capable of continuously measuring the concentration of a gas as contained in a liquid.

It is a further object of the present invention to provide a method of continuously measuring the concentration of a gas in a liquid.

It is a further object of the present invention to provide apparatus which will continuously measure the concentration of a gas contained in a liquid and will further change the concentration in accordance with the measurement obtained thereby to maintain a selected concentration.

It is a further object of the invention to provide an apparatus for measuring the concentration of a gas in a liquid wherein the sample analyzed is returned unaltered in composition to the process or liquid mass from which it was originally taken for analysis.

Figure 3:
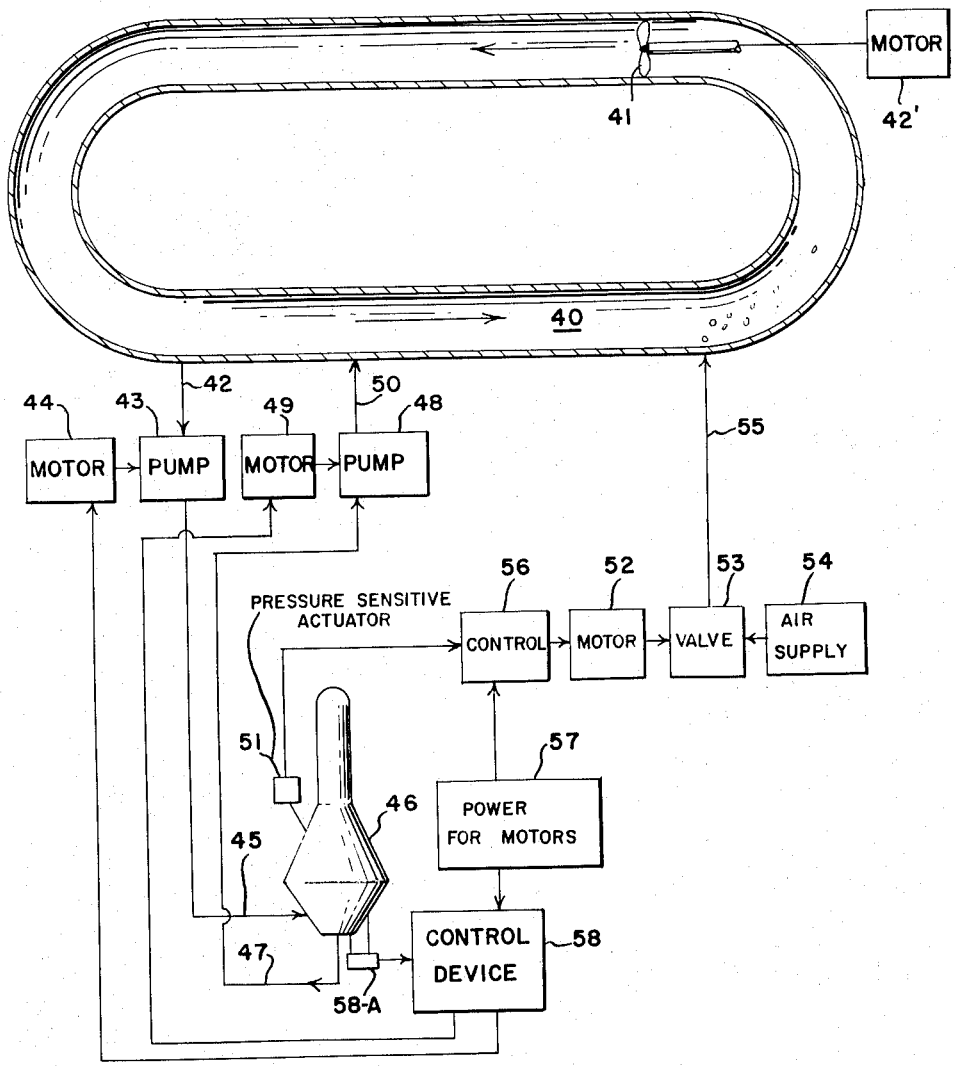

Other and further objects and features of the present invention will become apparent upon the careful consideration of the following description and accompanying drawings wherein:

Fig. 1 shows in elevational form, partly in cross-section, and not to scale, a typical device embodying the features of the present invention in simplified form;

Fig. 2 is an elevational view, also partly in cross-section, and not to scale, showing a more elaborate embodiment of the features of the present invention containing primarily the concentration measuring apparatus; and Fig. 3 is a diagram of a gas concentration and control system for measuring the concentration of air in a continuous stream of water and for controlling the concentration of the air in said stream responsive to the concentration measurements.

In accordance with the basic features of the present invention, method and apparatus for measuring the concentration of a gas in a liquid and particularly air in water is provided which gives a continuous indication of the gas concentration without requiring any elaborate analysis procedure or altering the composition of the sample selected for analysis thereby permitting the return of the sample to the original body of liquid. In this device, the sample to be analyzed is admitted at a selected rate into a closed chamber which is maintained in a condition wherein it is partly filled with liquid. The space above the liquid is filled with the gas or gases originally dissolved in the liquid and with liquid vapor due to the liberation of the gas from the sample. Continuous withdrawal of liquid, which is in equilibrium with the gas, from the lower portion of the chamber occurs at such a rate as to maintain the liquid level in the chamber constant. Under these conditions the pressure existing in the vapor space above the liquid will vary in accordance with the vapor pressure of the liquid and the partial pressure of liberated dissolved gas. An equilibrium content exists not only between the liquid and its vapor pressure but between the dissolved gas in the liquid and the liberated gas in the vapor space. To complete the observations made on the sample being analyzed, the temperature of the liquid in the chamber is measured to permit a determination of the vapor pressure corresponding thereto which is readily available. The relation between the concentration of the gas dissolved in the liquid and the equilibrium concentration of the free gas in contact with the liquid may then be ascertained from standard tabulations in the literature correlating the solubility of the particular gas under consideration in the liquid under consideration at various temperatures.

As further considerations of the basic features of the present invention the information thus obtained by observation and measurement is employed to control the introduction of further gas into the body of the liquid so that a desired degree of gas concentration may be obtained.

With particular reference now to Fig. 1 of the drawings, the apparatus shown therein comprises a chamber 10, shown in cross-section, which is constructed of any material suitable for containing the liquids and gases to be handled and of withstanding the pressures involved. In some situations it may be practical to employ a chamber 10 which is constructed of glass. In other applications, perhaps involving higher pressures or corrosive fluids, it may be more practical to employ a material such as steel or lead for the body of the chamber with some external level indication device to permit ready determination of the amount of liquid in the chamber.

The sample of the material to be analyzed containing a gas dissolved in a liquid, typically air in water, is admitted through line 11 as controlled by valve 12. Admission of the material to be analyzed into the chamber is preferably continuous through a spray nozzle device 13 which operates to atomize the sample material to obtain an intimate mixture between the sample material itself and the gas in the vapor space.

Exit from the chamber 10 of the material analyzed is from the pipe 14 at the lower end of the chamber at a rate controlled by the setting of valve 15. A pressure gauge 16 is connected to the chamber preferably in the low regions thereof, as indicated in Fig. 1, through the line 17. Although not shown in the basic Fig. 1, some sort of fluid transfer device such as a pump is normally used, in either the inlet or outlet line or both.

The material of which chamber 10 is constructed in Fig. 1 is glass with a suitable index mark or calibration 18 placed approximately mid-way therein as a level reference. The space above the liquid level, maintained substantially at the mark 18, is the vapor space, and is identified by the reference numeral 19. This vapor space 19 is of constant size in the embodiment shown, so that the gas volume of the vapor space obviously is constant.

Connected to the chamber 10 preferably at a point in the lower regions thereof is the pressure gauge 16, having a connecting pipe 17. The pressure gauge is preferably located at such a point that the effective liquid level in pipe 17 and the internal structure of gauge 16 itself is on the same level as the calibration line 18 itself to eliminate the influence of a hydrostatic head on the gauge reading. If the gauge is located elsewhere, the hydrostatic head must be taken into consideration. The gauge 16 may be connected into the vapor space rather than the liquid space but this is normally undesired because of the possibility that the connecting pipe 17 would be filled with a mixture of liquid and vapor or gas in unknown proportions and hence would introduce indeterminate errors.

The operation of this device is as follows:

The material to be analyzed is delivered through valve 12 and pipe 11 and nozzle 13 as a fine spray or mist which descends into the chamber 10 while material is continuously withdrawn from the chamber through line 14 at such a rate as to maintain the level of the liquid in chamber 10 constant relative to the index mark 18. Under this condition, the indication of the pressure gauge 16 is recorded as is the temperature of the material in the chamber through a thermometer, not shown, which may be in the exit line 14 or in the chamber 10 itself if so desired.

From the pressure indication it is then readily possible to determine the gas concentration in the material sampled. The pressure gauge 16 itself may be calibrated to indicate gas concentration directly for a selected temperature. Alternatively, the pressure gauge 16 could be provided with a series of interchangeable calibrations for various temperatures, one of which would be selected as appropriate depending upon the temperature of the chamber 10.

Satisfactory operation of the device depends to a large extent upon the intimacy of the mixture of the atomized sample material and the vapor in the upper regions of chamber 10, the liquid either absorbing or liberating gas in this region to obtain an equilibrium condition.

Refinements of this device may include automatic flow control apparatus responsive to the water level in chamber 10 to control the rate of material admission or withdrawal to maintain a constant level. Liquid level control apparatus suitable for such applications are well known in the art. Typically either the inlet or the outlet flow rate would be held substantially constant as by a constant speed motor and pump combination while the other would be varied as needed to maintain the liquid level constant.

Under certain conditions, it is possible that a considerable portion of the gas will be contained either in the liquid entering the chamber or in the liquid leaving the chamber in an undissolved state, that is in the form of an emulsion. When this condition exists, it is important that adequate agitation of the liquid in the chamber together with efficient atomizing by the spray nozzle 13 be obtained, otherwise the pressure indicated will not be an accurate measure of the concentration of the gas and the liquid in the sample material entering the chamber.

From the foregoing, it will be understood that an essential principle of operation of the device of the present invention is the establishment of equilibrium between the concentration of the gas in the liquid and the concentration of the separated gas trapped within the chamber, the volume occupied by the gas so trapped being maintained substantially constant by manual or automatic means. Essential to the establishment of such an equilibrium are the surface exposure of the sample liquid within the chamber and the repeated renewal of the sample therein exposed. A preferred manner of accomplishing the required renewal of the liquid sample being exposed within the chamber is the continuous circulation of sample material through the chamber, however, it is not beyond the realm of possibility to employ an intermittent flow of sample material if such be desired.

In the foregoing description, the operation of an instrument embodying the present invention has been described primarily where the liquid contains only one kind of gas. Where two or more different gases are contained in the liquid, each will act independently of the other according to Dalton's Law and the pressure in the chamber will approach a value which is the total of the pressures corresponding to the concentration in the liquid of each gas separately.

With reference now to Fig. 2 of the drawing, a variant embodiment of the features of the present invention is shown in which the volume of the gas trapped within the chamber is automatically maintained substantially constant as contrasted to Fig. 1 where manual level control is required.

The sample material to be analyzed is admitted through the pump 20 which is driven by motor 21. This inlet fluid is delivered through the center of the chamber 22 by means of inlet pipe 23 passing in an upward direction and emerging into the chamber 22 at the spray nozzle 24. Liquid is withdrawn from the chamber 22 at the lower end thereof through pipe 25 by means of pump 26 which is driven by motor 27. Discharge from the pump 26 is returned to the body of liquid which was sampled.

Chamber 22 in this illustration is of a more complex structure than that of the basic Fig. 1 employing an upper cylindrical portion which contains essentially the vapor space together with a lower portion of double conical shape providing a large body of liquid below the relatively small diameter vapor space. The reason for this enlarged diameter liquid region is to provide a means for reducing the downward velocity of the liquid to permit gas bubbles which are liberated or entrapped in that region to rise into the vapor space rather than to be carried away in the outlet tube to introduce erroneous readings. Chamber 22 is provided with a suitable pressure gauge 28 which connects into the liquid space through pipe 29.

As an added refinement the vapor region of chamber 22 contains a cylindrical member 22–A of somewhat smaller diameter than the chamber 22 itself which is included to provide additional surface upon which the liquid may accumulate to increase the effective surface exposed in the vapor space. Preferably the member 22–A is solid or completely closed except for passageways for tubes 23 and 30.

Liquid level sensing apparatus is incorporated into the device of Fig. 2 including the long vertical tube 30 extending through the lower region of chamber 22 up to the vicinity of nozzle 24 and the short vertical tube 31 extending into the lower section of chamber 22. Tubes 30 and 31 connect to a suitable differential pressure sensing device 33 which, in the simple case, may be merely a manometer as shown in the drawing. In operation, tube 30 is filled with liquid to its top by a portion of the spray from nozzle 24 falling into the open upper end thereof. Thus the differential pressure measuring devices 33 will measure the difference in liquid level between the upper end 34 of tube 30 and the actual liquid level 35 existing in the chamber. Typically if the device 33 is a manometric device it would contain mercury which provides a convenient method of operating contacts as shown extending into the mercury to control the operation of the motors 21 and 27 varying the speed as appropriate to maintain the level 35 at the desired point. To this end appropriate electrical or mechanical connections would exist between the pressure sensitive device 33 and a control device 36 for the motors 21 and 27. The actual structure of the control device 36 is of no particular significance in the present invention, it being merely a matter of engineering. Typically it may be merely a switch for either motor 21 or 27 and a variable speed control device of conventional structure for controlling the other motor responsive to the liquid level sensing.

Operation and measurements with the apparatus of Fig. 2 are substantially the same as those previously discussed in connection with Fig. 1.

With reference now to Fig. 3 of the drawing, a further modification of the present invention is shown which provides automatic control of the concentration of a gas in a fluid stream. Concentration measuring apparatus such as that as of Figs. 1 and 2 is employed to determine the concentration of the gas in the liquid. From this determination, control signals are derived which automatically regulate the introduction of gas into the liquid stream as required to maintain a selected concentration. The apparatus of Fig. 3 contains a moving stream of water 40 to which motion is imparted by a propeller 41 which is driven by a suitable motive means such as motor 42'. A continuous sample of the water in the stream is withdrawn through the line 42 by means of pump 43 which is typically driven at constant speed from motor 44. Fluid discharged from pump 43 is delivered through line 45 to the analyzer device 46 which in this typical illustration may be indicated as that shown in Fig. 2. Fluid is pumped from the lower portion of the analyzer device 46 through the line 47 by means of pump 48 which is typically driven at a controlled speed by motor 49. Pump 48 discharges through line 50 back to the main body of the moving stream 40.

The pressure gauge 28 as employed in Fig. 2, being merely an indicator therein is substituted in Fig. 3 by a suitable pressure sensitive switch 51 which opens or closes at a preselected pressure to operate through a motive device 52, which may be a suitably geared motor or a diaphragm, a flow control valve 53 which regulates the flow of air from a supply 54 through line 55 into the stream 40. Operation of this control circuit may be improved under certain conditions by the inclusion of suitable amplifier or control device 56 or any suitable conventional structure between the switch 51 and the motor 52. In such case, control device 56 will receive power or air from a suitable source 57 and supply it to the motive device 52.

Additional apparatus shown in Fig. 3 includes control apparatus for the sample withdrawal and control motors 44 and 49 comprising the liquid level actuated switch device 58A which through control device 58 controls the application of power for the motors from source 57.

In accordance with the foregoing discussion measuring and control apparatus is provided for determining the concentration of a gas in a liquid and for operating to vary the concentration of such gas to maintain a selected concentration.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention as set forth in the appended claims.

What is claimed is:

1. An apparatus for measuring the concentration of a gas dissolved in a liquid, comprising, a chamber having a gas space of predetermined volume, means for spraying the liquid directly into said gas space, means for withdrawing liquid from said chamber as quickly as it is sprayed thereinto, said chamber comprising a lower portion for liquid, said lower portion being horizontally enlarged with respect to said gas space, whereby to keep the liquid therein relatively quiescent, and pressure-sensitive means connected to said chamber.

2. An apparatus for measuring the concentration of a gas dissolved in a liquid, comprising, a chamber having walls providing a relatively narrow vertically elongated cylindrical upper gas space and a horizontally enlarged lower liquid space, means for delivering a spray of the liquid directly into and spread throughout a major portion of said gas space, means at the bottom of said liquid space for withdrawing liquid from said chamber, control means for controlling the rate at which liquid is sprayed into and withdrawn from said chamber, and a pressure-sensitive device connected to said chamber.

3. An apparatus as defined in claim 2 wherein said walls at said liquid space flare in opposite directions from the upper and lower portions of said liquid space.

References Cited in the file of this patent
UNITED STATES PATENTS
2,119,786  Kallam _____ June 7, 1938